Jan. 2, 1945.  A. A. SCHEID  2,366,427
DRINKING FOUNTAIN
Filed Jan. 21, 1944

Inventor
ARTHUR A. SCHEID

By Clarence A. O'Brien
and Harvey B. Jacobson
Attorneys

Patented Jan. 2, 1945

2,366,427

UNITED STATES PATENT OFFICE 2,366,427

DRINKING FOUNTAIN

Arthur A. Scheid, Rochelle Park, N. J.

Application January 21, 1944, Serial No. 519,177

1 Claim. (Cl. 299—17)

The present invention relates to new and useful improvements in drinking fountains, and has for its primary object to provide, in a manner as hereinafter set forth, a device of this character which may be conveniently carried in the pocket or purse and readily attached to a conventional faucet.

Other objects of the invention are to provide a portable, sanitary drinking fountain of the character described which will be comparatively simple in construction, strong, durable, compact and which may be manufactured at low cost.

All of the foregoing and still further objects and advantages of the invention will become apparent from a study of the following specification, taken in connection with the accompanying drawing, wherein like characters of reference designate corresponding parts throughout the several views, and wherein.

Figure 1:
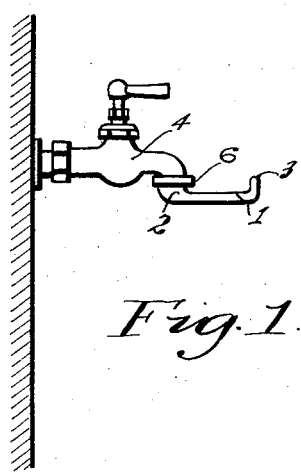
Figure 1 is a view in side elevation, showing a portable, sanitary drinking fountain constructed in accordance with the present invention applied to a faucet.
Figure 2:
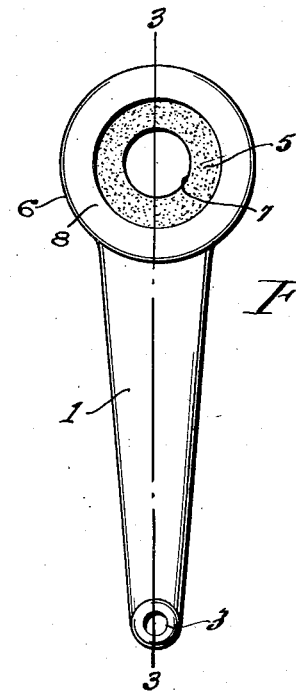
Figure 2 is a top plan view of the device.
Figure 3:
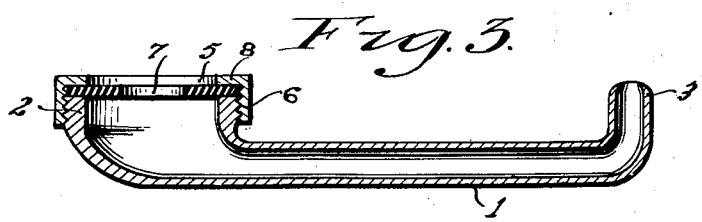
Figure 3 is a view in longitudinal section through the device, taken substantially on the line 3—3 of Figure 2.
Figure 4:
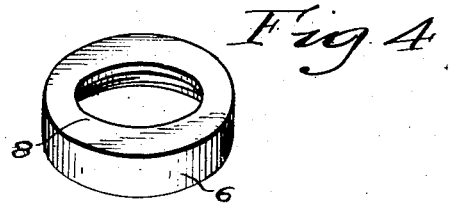
Figure 4 is a detail view in perspective of the flanged nut or ring which retains the sealing gasket in position on one end of the device.

Referring now to the drawing in detail, it will be seen that the embodiment of the invention which has been illustrated comprises a substantially flat, tapered tube I of suitable dimensions and material. Formed integrally with the large end portion of the tube I is an enlarged, upturned, externally threaded neck 2. At its small end, the tube I terminates in an integral, upturned nozzle 3.

The neck 2 is for the reception of a conventional faucet 4 for mounting the tube I horizontally thereon. Toward this end, a resilient gasket 5 of live rubber or other suitable material is mounted on the upper end of the neck 2. An internally flanged retaining nut or ring 6 for the gasket 5 is threaded on the neck 2. The gasket 5 is provided with a relatively small opening 7 for the reception of the faucet 4.

It is thought that the operation of the device will be readily apparent from a consideration of the foregoing. Briefly, to mount the fountain on a faucet, the gasket 5 is engaged with the discharge end of said faucet. The opening 7 is smaller than the faucet which it is to receive. Thus, it is necessary to force the gasket 5 upwardly on the faucet, the neck 2 receiving said faucet. In this manner the gasket 5 is stretched or tensioned for frictionally gripping the faucet and sealing the connection of the fountain thereto against leakage. The faucet 4 is then opened and water therefrom flows through the tube I and is discharged upwardly therefrom by the nozzle 3. The marginal portion of the gasket 5 is firmly secured on top of the neck 2 by the flange 8 of the nut or ring 6. The resilient gasket 5 permits the device to be readily applied to different types and sizes of faucets.

It is believed that the many advantages of a portable drinking fountain constructed in accordance with the present invention will be readily understood, and although a preferred embodiment of the device is as illustrated and described, it is to be understood that changes in the details of construction may be resorted to which will fall within the scope of the invention as claimed.

What is claimed is:

A portable, sanitary drinking fountain of the character described comprising a tube which is substantially flat vertically and tapered in width from one end to the other, an enlarged upstanding neck integral with the large end of the tube, a resilient gasket mounted on top of the neck, said gasket having a comparatively small opening therein for the snug reception of the discharge spout of a faucet, said gasket being engageable under tension with the faucet for frictionally gripping the same and thereby removably mounting the tube thereon, a flanged retaining nut for the gasket threadedly mounted on the neck, said nut including an inturned flange engaged with the marginal portion of the gasket, and an upstanding discharge nozzle integral with the small end of the tube.

ARTHUR A. SCHEID.